(12) United States Patent
Bastin et al.

(10) Patent No.: US 10,933,684 B2
(45) Date of Patent: Mar. 2, 2021

(54) PRINTED DECORATIVE FLOOR OR WALL COVERINGS

(71) Applicant: Tarkett GDL, Lentzweiler (LU)

(72) Inventors: Pierre Bastin, Wiltz (LU); Igor Brankov, Wiltz (LU); Luc Forget, Wiltz (LU); Klaas Kackmann-Schneider, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 33 days.

(21) Appl. No.: 15/736,408

(22) PCT Filed: Jun. 17, 2016

(86) PCT No.: PCT/EP2016/064048
§ 371 (c)(1),
(2) Date: Dec. 14, 2017

(87) PCT Pub. No.: WO2017/001213
PCT Pub. Date: Jan. 5, 2017

(65) Prior Publication Data
US 2018/0186176 A1  Jul. 5, 2018

(30) Foreign Application Priority Data

Jun. 30, 2015  (EP) .................................... 15174574

(51) Int. Cl.
| | | |
|---|---|---|
| B44C 5/04 | (2006.01) | |
| C08L 27/06 | (2006.01) | |
| B32B 27/08 | (2006.01) | |
| B32B 27/20 | (2006.01) | |
| B32B 27/22 | (2006.01) | |
| B41M 5/00 | (2006.01) | |
| B32B 27/30 | (2006.01) | |
| B32B 27/28 | (2006.01) | |
| B41M 3/18 | (2006.01) | |
| B32B 27/18 | (2006.01) | |
| B32B 27/34 | (2006.01) | |
| B32B 27/36 | (2006.01) | |
| B32B 27/40 | (2006.01) | |
| E04F 15/10 | (2006.01) | |
| E04F 13/08 | (2006.01) | |
| E04F 13/18 | (2006.01) | |
| C08L 31/02 | (2006.01) | |

(Continued)

(52) U.S. Cl.
CPC ............ *B44C 5/0461* (2013.01); *B32B 27/08* (2013.01); *B32B 27/18* (2013.01); *B32B 27/20* (2013.01); *B32B 27/22* (2013.01); *B32B 27/285* (2013.01); *B32B 27/30* (2013.01); *B32B 27/304* (2013.01); *B32B 27/308* (2013.01); *B32B 27/34* (2013.01); *B32B 27/365* (2013.01); *B32B 27/40* (2013.01); *B41M 3/18* (2013.01); *B41M 5/0047* (2013.01); *B41M 5/0064* (2013.01); *B44C 5/04* (2013.01); *C08L 27/06* (2013.01); *B32B 2255/10* (2013.01); *B32B 2255/26* (2013.01); *B32B 2264/102* (2013.01); *B32B 2270/00* (2013.01); *B32B 2307/4023* (2013.01); *B32B 2307/4026* (2013.01); *B32B 2307/412* (2013.01); *B32B 2307/75* (2013.01); *B32B 2451/00* (2013.01); *B32B 2471/00* (2013.01); *B32B 2607/02* (2013.01); *C08L 31/02* (2013.01); *C08L 33/02* (2013.01); *C08L 33/06* (2013.01); *C08L 2205/025* (2013.01); *C08L 2205/03* (2013.01); *C08L 2205/035* (2013.01); *C09D 11/10* (2013.01); *E04F 13/0866* (2013.01); *E04F 13/18* (2013.01); *E04F 15/105* (2013.01); *E04F 15/107* (2013.01)

(58) Field of Classification Search
CPC .......... C08L 31/02; C08L 33/06; C08L 27/06; C08L 67/04; C08L 2205/03; C08L 23/0853; C08L 31/04; C08L 2205/025; C08L 2205/035; C08L 29/14; C08L 33/02; C08L 33/10; B32B 2307/554; B32B 2307/716; B32B 2307/732; B32B 2419/00; B32B 2419/04; B32B 27/00; B32B 27/06; B32B 27/16; B32B 27/28; B32B 27/285; B32B 27/304; B32B 27/34; B32B 27/365; B32B 27/40; B32B 3/00; B32B 3/06; B32B 3/16; B32B 5/022; B32B 7/00; B32B 7/10; B32B 7/12; B32B 9/00; B32B 9/04; B32B 9/048; E04F 15/105; E04F 15/107; E04F 13/0866; E04F 13/18; E04F 15/102; B41M 3/18; B41M 5/0047; B41M 5/0064; B44C 5/04; B44C 5/0461; C08J 2329/14; C08J 2333/10; C08J 2429/14; C08J 2433/10; C08J 2467/04; C08J 5/02; C09D 11/10

See application file for complete search history.

(56) References Cited

U.S. PATENT DOCUMENTS 3,066,109 A   11/1962   Hechtman et al.
5,585,194 A   12/1996   Norman
(Continued)

*Primary Examiner* — Frances Tischler
(74) *Attorney, Agent, or Firm* — Reinhart Boerner Van Deuren P.C.

(57) ABSTRACT

The present invention is related to printed floor or wall coverings comprising one or more polymer layer(s) and a print obtained by ink composition printing directly on at least one surface of said one or more polymer layer(s), said polymer layer(s) comprising a polyvinyl chloride homo- and/or copolymer in a blend with one or more polymer(s) selected from the group consisting of the homo- or copolymers of one or more vinyl alkanoate(s), the copolymers comprising one or more alkenes and one or more vinyl alkanoate(s), the copolymers comprising one or more alkyl (meth)acrylates, and mixtures of said homo- and/or copolymers.

19 Claims, No Drawings

(51) Int. Cl.
  *C08L 33/02* (2006.01)
  *C08L 33/06* (2006.01)
  *C09D 11/10* (2014.01)

(56) References Cited

U.S. PATENT DOCUMENTS

| | | |
|---|---|---|
| 6,800,340 B1 | 10/2004 | Francescutti |
| 2014/0144583 A1 | 5/2014 | Hakansson et al. |

PRINTED DECORATIVE FLOOR OR WALL COVERINGS

FIELD OF THE INVENTION

The present invention is related to decorative floor and wall coverings comprising a printed thermoplastic material. The invention is further related to a method for the production of said surface coverings.

STATE OF THE ART

In recent years, printed building panels have gained increasing success. These types of decorative floor and wall panels usually comprise a thermoplastic substrate and a protective layer. The thermoplastic material is often polyvinyl chloride. The substrate is printed with a pattern resembling natural stone, wood, ceramics etc. The pattern is often printed by rotogravure printing or direct printing Recently digital printing has offered new possibilities to the flooring industry to customize decorative patterns for floor and wall applications and to print small quantities of substrates. By digital printing is conventionally meant printing by means of non-contact printing, for example using a Drop-on-Demand (DOD) technique. A drop of ink is placed with great accuracy on a surface. Examples of DOD techniques are piezoelectric DOD inkjet and thermal DOD inkjet. In a piezoelectric DOD inkjet printer, the piezoelectric material changes shape when a voltage is applied. The change of shape of the piezoelectric material generates a pressure pulse in the fluid, thereby ejecting a droplet of ink from the nozzle. In a thermal DOD inkjet printer, ink drops are ejected by forming an ink vapor bubble by heating the ink.

Digital printers use one of two methods to print: single-pass and multi-pass. In the first case, the surface to be printed is fed in a single pass over four print heads, representing the four primary colors (cyan, magenta, yellow and black), which results in faster printing. In multi-pass, the same surface travels a longer path since it goes through four successive passes (one per color). Multi-pass reduces the cost of the printer since there's only one drum for all the primary colors, whereas with single-pass, there has to be one drum per primary color, but of course printing times are at least four times as long.

Different kind of inks may be used, such as UV curable inks, solvent based inks and aqueous inks (also called waterborne or water based inks). When printing on a thermoplastic substrates such as a substrate adapted to from decorative surface coverings, printing is facilitated by using UV curable inks or solvent based inks compared to aqueous inks.

Inks based on organic solvents adhere directly to a plastic film and dry quickly on the plastic film surface.

There are also known organic inks based on relatively high-boiling water-free solvents. These solvents are non-explosive, but they dry only slowly. Disadvantages of these organic inks is that when dots of ink are applied they easily run, because drying is slow, and this militates against sharp profiles and the clean printing of different colors adjacent to one another.

U.S. Pat. No. 6,800,340 discloses a method of using a plastic film for printing with organic ink in an inkjet process, comprising ink jet printing directly on the plastic film with the organic ink, wherein the plastic is selected from polyvinyl chloride, polyethylene, polypropylene, polystyrene, polycarbonate, poly(meth)acrylate or mixtures of these, and the plastic film further comprises from 5 to 50% of cellulose esters, where the esters contain acetyl, propionyl, or butyryl groups.

Printing with an aqueous ink on a thermoplastic substrate has proved to be difficult. A drop of an aqueous ink does not stay but tends to bleed on the thermoplastic surface, resulting in a print of low quality. However, due to environmental reasons, it is favorable to replace solvent based inks.

In order to provide an improved print on a thermoplastic material, obtained from digital printing of an aqueous pigment ink, US 2014/0144583 discloses an aqueous solution comprising a salt, preferably at least one metal salt, for being used as a primer before the digital printing step.

The metal salt may be a monovalent metal salt, for example comprising a monovalent ion such as $Na^+$. The metal salt may be a polyvalent metal salt. Preferably, the polyvalent metal salt comprises divalent ions such as $Ca^{2+}$, $Cu^{2+}$, $Ni^{2+}$, $Mg^{2+}$, $Zn^{2+}$, or $Ba^{2+}$, or trivalent ions such as $Al^{3+}$ or $Fe^{3+}$. The metal salt may for example be sodium chloride or calcium chloride. The salt may also be a non-metal salt such as ammonium chloride.

AIMS OF THE INVENTION

The present invention aims to provide printed decorative floor and wall coverings comprising high quality images obtained from printing (including digital printing) of ink compositions directly on the thermoplastic surface.

A further aim of the present invention is to provide a method for producing said printed decorative floor and wall coverings.

SUMMARY OF THE INVENTION

The present invention discloses a printed decorative surface covering comprising one or more polymer layers said one or more polymer layers comprising a blend of, in relative proportions:
  100 parts by weight of a first polymer selected from the group consisting of polyvinyl chloride, copolymers of vinylchloride and other ethylenically unsaturated monomers, and mixtures thereof;
  from 5 to 100 parts by weight, preferably from 15 to 80 parts by weight, more preferably from 20 to 70 parts by weight of a second polymer selected from the group consisting of:
    i. homo- or copolymer(s) comprising one or more vinyl alkanoate(s) defined by the general formula $RCOOCH=CH_2$, wherein R is an alkyl radical containing from 1 to 20 carbon atoms;
    ii. copolymers comprising one or more vinyl alkanoate (s), defined by the general formula $RCOOCH=CH_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
    iii. copolymers of alkyl (meth)acrylate(s) with 1 to 8 carbon atom(s) in the alkyl group; and
    iv. mixtures of i.) and ii.); i.) and iii.); ii.) and iii.); and i.), ii.) and iii.).

Preferred embodiments of the present invention disclose one or more of the following features:
  the first polymer is characterized by a K-value comprised between 70 and 50, preferably between 65 and 52, more preferably between 60 and 55, according to DIN 53726 (0.5 g/100 ml cyclohexanone @ 25° C.);

the second polymer is characterized by a glass transition temperature of 80° C. or less, preferably comprised between −20° C. and 80° C., more preferably comprised between 0° C. and 80° C., most preferably comprised between 5° C. and 75° C., measured by Differential Scanning calorimetry (DSC), according to ASTM D3418 with a heating gradient of 20° C. per minute;

the vinyl alkanoate homo- or copolymer i.) comprises 60% by weight or more, preferably 70% or more, more preferably 80% or more, most preferably 90% or more of vinyl acetate;

the alkene/vinyl alkanoate copolymer ii.) comprises 60% by weight or more, preferably 70% or more, more preferably 80% or more, most preferably 85% or more of vinyl alkanoate;

the alkyl (meth)acrylate copolymer iii.) is a block copolymer comprising one or more blocks of methacrylic ester units and one or more blocks of acrylic ester units.

the alkyl (meth)acrylate copolymer iii.) is a tri-block copolymer comprising a n-butylacrylate block and two methyl methacrylate blocks;

the one or more polymer layers comprise, per 100 parts of first polymer, up to 70 parts by weight, preferably from 5 to 70 parts by weight, more preferably from 10 to 60 parts by weight, most preferably from 15 to 50 parts by weight or even from 20 to 40 parts by weight of one or more plasticizer(s) selected from the group consisting dialkyl esters of cyclohexane dicarboxylic acids; dialkyl esters of aliphatic dicarboxylic acids; alkyl esters of aromatic mono- di-, tri-, or tetra-carboxylic acids; lower alkyl citrates; epoxidized or otherwise derivatized vegetable oils; lower alkyl phosphates, alkyl sulfonates and mixtures thereof;

the one or more polymer layer(s) comprise a decorative print on at least on side of the one or more layer(s), said decorative print comprising one or more polymer(s) and/or oligomers selected from the group consisting of polyolefins, poly(meth)acrylics, polyesters, polyamides, polyvinyl chloride, latex, polycarbonates, polyurethanes, polyethers, alkyd resins and mixtures thereof and one or more dyes and/or pigments.

The present invention further discloses a process for the preparation of the printed decorative surface covering, comprising the steps of:

step 1: providing one or more polymer layer(s), said one or more polymer layer(s) comprising the first polymer and the second polymer;

step 2: applying a print on at least one surface of the at least one polymer layer, with an ink composition;

step 3: drying and/or curing the ink composition to form the printed substrate.

Preferred embodiments of the process for the preparation of said printed decorative surface covering disclose one or more of the following features:

the ink composition is an aqueous ink composition;

the ink composition is a radiation curable ink composition;

the at least two layers of step 1 are contacted through calendering forming a layer stack which further is converted in step 2 and 3 into a printed layer stack;

the at least two layers of step 3, having a print on at least one surface of at least one of said layers, are contacted through calendering forming a printed layer stack;

in an additional step the top-surface of the printed layer stack is contacted with a protecting layer said protecting layer comprising the first polymer;

the protecting layer is contacted to the printed layer stack through calendering;

the top surface of the protecting layer is contacted with a topcoat layer comprising a cross-linked material;

the topcoat layer is obtained from application and curing a radiation curable coating composition, said radiation curable composition comprising ethylenically unsaturated acrylic, ester, ether or urethane comprising polymers, oligomers or monomers.

DETAILED DESCRIPTION OF THE INVENTION

The present invention provides decorative floor and wall coverings comprising high quality prints, obtained from printing of ink compositions directly on at least one surface of at least one polymer layer, said at least one polymer layer preferably being part of at least two polymer layers constituting said final surface covering, said polymer layers comprising polyvinyl chloride and/or polyvinyl chloride copolymer(s).

It has been surprisingly found that the partial substitution of polyvinyl chloride and/or polyvinyl chloride copolymer (s) by one or more particular polymer(s), while reducing the amount of plasticizer(s), result in polymer layers with modified surface properties, obtainable from conventional processing conditions and enabling said high quality prints. With high quality prints the present invention means prints having a perfect delineation, sharpness, color strength and adherence to the polymer layer.

The present invention provides printed decorative surface coverings comprising one or more polymer layers, said one or more polymer layers comprising a first polymer selected from the group consisting of polyvinyl chloride, polyvinyl chloride copolymer and mixtures thereof in a blend with a second polymer selected from the group consisting of:

i. the homo- or copolymers of one or more vinyl alkanoate (s), ii. the copolymers comprising one or more alkenes and one or more vinyl alkanoate(s), iii. the copolymers comprising one or more alkyl (meth) acrylates and iv. mixtures thereof.

The polyvinyl chloride copolymers are copolymers of vinyl chloride and other ethylenically unsaturated monomers including for example vinyl alkanoates such as vinyl acetate, vinyl propionate and the like; vinyl halides such as vinylidene bromide, vinylidene chloride and the like; unsaturated hydrocarbons such as ethylene, propylene, isobutylene and the like; allyl compounds such as allyl acetate, allyl chloride and the like.

The polyvinyl chloride copolymer comprises at least 70% by weight, preferably at least 75% by weight, more preferably at least 80% by weight, most preferably at least 85% by weight of vinyl chloride.

The first polymer for being used in the polymer layers according to the present invention, is characterized by a Fikentscher K-value according to DIN 53726 (0.5 g/100 ml cyclohexanone @ 25° C.) comprised between 70 and 50, preferably between 65 and 52, more preferably between 60 and 55.

The K-value, being derived from the solution viscosity, correlates intrinsic viscosity and average degree of polymerization. Typically the higher the K value the better the mechanical properties but the lower the flowability.

While for conventional PVC-based floor and wall coverings a K value comprised between 65 and 90 is preferred, it has been found that processing, in particular calendering, is improved for the polymer blend according to the present invention, wherein a first polymer with a K value less than 70, preferably less than 65 is used.

The first polymer for being used in the at least two polymer layers according to the present invention, preferably is characterized by a number average molecular weight comprised between 60000 and 25000 g/mole, more preferably between 50000 and 30000 g/mole, most preferably between 45000 and 35000 g/mole.

The homo- or copolymers i.) comprising one or more vinyl alkanoate(s) are polymers comprising one or more vinyl alkanoate monomer(s), defined by the general formula $RCOOCH=CH_2$, wherein R is an alkyl radical containing from 1 to 20 carbon atoms, and are preferably selected from the group consisting of vinyl formate, vinyl acetate, vinyl propionate, vinyl butyrate, vinyl octanoate and vinyl stearate.

Preferably the vinyl alkanoate copolymers comprise at least 60% by weight, more preferably at least 70% by weight, most preferably at least 80% by weight or even at least 90% by weight of vinyl acetate. Preferably the vinyl alkanoate polymer is polyvinyl acetate.

The copolymers ii.) comprising one or more alkenes and one or more vinyl alkanoate(s) are copolymers, wherein the one or more alkenes are defined by the general formula $R_1R_2C=CR_3R_4$, wherein $R_1$, $R_2$, $R_3$ and $R_4$ independently is a hydrogen or an alkyl radical containing from 1 to 4 carbon atoms, and are preferably selected from the group consisting of ethene, propene, 1-butene, 1-pentene, 1-hexene, 2-methyl-1-butene, 2,3-dimethyl-1-pentene; and wherein the one or more vinyl alkanoate monomer(s) are defined by the general formula $RCOOCH=CH_2$, wherein R is an alkyl radical containing from 1 to 20 carbon atoms, and are preferably selected from the group consisting of vinyl formate, vinyl acetate, vinyl propionate, vinyl butyrate, vinyl octanoate and vinyl stearate.

Preferably the alkene/vinyl alkanoate copolymer ii.) comprises at least 60% by weight, more preferably at least 70% by weight, most preferably at least 80% by weight or even at least 85% by weight of one or more vinyl alkanoate(s) and 40% or less, preferably 30% or less, more preferably 20% or less, most preferably 15% or less of one or more 1-alkene(s).

Preferably the alkene/vinyl alkanoate copolymer is an ethylene/vinyl acetate copolymer comprising at least 60% by weight, preferably at least 70% by weight, more preferably at least 80% by weight, most preferably at least 85% by weight of vinyl acetate.

The alkyl (meth)acrylate copolymers iii.) comprise alkyl (meth)acrylates with 1 to 8 carbon atoms in the alkyl group; said alkyl (meth)acrylates are selected from the group consisting of methyl (meth)acrylate, ethyl (meth)acrylate, n-propyl (meth)acrylate, n-butyl (meth)acrylate, i-butyl (meth)acrylate, n-hexyl (meth)acrylate, and 2-ethylhexyl (meth)acrylate.

The alkyl (meth)acrylate copolymers may be random copolymers.

Preferably, the alkyl (meth)acrylate copolymer iii.) used in the present invention is a block copolymer, comprising from 10 to 90% by weight, preferably from 20 to 80% by weight of one or more block(s) comprising alkyl methacrylate monomers and from 90 to 10% by weight, preferably from 80 to 20% by weight of one or more blocks comprising alkyl acrylate monomers.

Preferably the glass transition temperature (measured by Differential Scanning calorimetry, according to ASTM D3418 with a heating gradient of 20° C. per minute) of the alkyl methacrylate comprising blocks is comprised between 70 and 110° C., more preferably between 80 and 110° C. and most preferably between 90 and 110° C. The glass transition temperature of the alkyl acrylate comprising blocks is comprised between −70 and −20° C., preferably between −60 and −30° C. and more preferably between −50 and −40° C.

Preferably the alkyl (meth)acrylate copolymer is a di-block copolymer comprising a block comprising alkyl acrylate monomers and a block comprising alkyl methacrylate monomers such as for example a di-block copolymer comprising a block comprising n-butyl acrylate monomers and a block comprising methyl methacrylate monomers.

The alkyl (meth)acrylate copolymer more preferably is a tri-block copolymer comprising one block comprising alkyl acrylate monomers and two blocks comprising alkyl methacrylate monomers such as for example a tri-block copolymer comprising one block comprising n-butyl acrylate monomers and two blocks comprising methyl methacrylate monomers.

The one or more polymer layer(s) of the printed decorative surface coverings according to the present invention comprise(s), per 100 parts by weight of the first polymer, between 5 and 100 parts by weight, preferably between 15 to 80 parts by weight, more preferably from 20 to 70 parts by weight, most preferably between 26 and 60 parts by weight or even between 31 and 55 parts by weight of second polymer.

The one or more polymer layer(s) of the printed decorative surface coverings according to the present invention further may comprise, per 100 parts by weight of the first polymer, up to 5 parts by weight of one or more (co)polymers different from the second polymer such as for example a polyvinyl acetal, polyurethane, polyolefin among others.

It now has been found that polymer layers comprising the above blend, allow for high quality prints when the second polymer is characterized by a glass transition temperature or an average glass transition temperature when block copolymers are concerned, of 80° C. or less, preferably comprised between −20 and 80° C., more preferably between 0 and 80° C., most preferably between 5 and 75° C. or even between 10 and 70° C., measured by Differential Scanning calorimetry (DSC), according to ASTM D3418 with a heating gradient of 20° C. per minute.

By average glass transition temperature the present invention means the arithmetic mean of the two transitions, corresponding to the glass transition temperature for each type of block.

In general, the polymer layers of conventional PVC floor and wall coverings comprise about equivalent amounts of PVC (100 parts) and of plasticizer (100 parts).

The inventors further have found that optimization of print quality and processing conditions results from reducing the amount of plasticizer, or even entirely omitting the plasticizer(s), said plasticizer(s) in general being a liquid, characterized by a molecular weight of 2000 g/mole or less, preferably of 1500 g/mole or less, more preferably of 1000 g/mole or less.

The one or more polymer layer(s) of the printed decorative surface coverings according to the present invention comprise(s), per 100 parts by weight of first polymer, up to 70 parts by weight, preferably from 5 to 70 parts by weight, more preferably from 10 to 60 parts by weight, most preferably from 15 to 50 parts by weight and or even 20 to 40 parts by weight of one or more plasticizer(s) selected from the group consisting dialkyl esters of cyclohexane dicarboxylic acids, dialkyl esters of aliphatic dicarboxylic acids, alkyl esters of aromatic mono-di-, tri-, or tetra-carboxylic acids, lower alkyl citrates, epoxidized or otherwise derivatized vegetable oils, lower alkyl phosphates and lower alkyl sulfonates.

Dialkyl esters of cyclohexane dicarboxylic acids are preferably selected from the group consisting of the $C_4$-$C_{18}$ di-alkyl esters of (methyl) 1,2- and 1,4-cyclohexane dicarboxylic acid.

Dialkyl esters of aliphatic dicarboxylic acids are preferably selected from the group consisting of the $C_6$-$C_{18}$ di-alkyl esters of a $C_4$-$C_7$ dicarboxylic acid.

Alkyl esters of aromatic di-, tri-, or tetra-carboxylic acids are preferably selected from the group consisting of the $C_1$-$C_{20}$ di-alkyl of ortho-, iso and terephthalic acid, the benzyl $C_1$-$C_{20}$ alkyl esters of ortho-, iso and terephthalic acid, the $C_6$-$C_{20}$ tri-alkyl esters of trimellitic acid and the $C_6$-$C_{20}$ tetra-alkyl esters of pyromellitic acid.

Alkyl esters of aromatic monocarboxylic acid are preferably selected from the group consisting of the $C_6$-$C_{18}$ alkyl esters of benzoic acid and di- and tri-$C_2$-$C_3$ alkylene glycol dibenzoate.

Lower alkyl citrates are preferably selected from the $C_2$-$C_8$ tri-alkyl esters of (acetyl) citric acid.

Epoxidized or otherwise derivatized vegetable oils are preferably selected from the group consisting of epoxidized soybean oils, epoxidized linseed oil, epoxidized soy oil and epoxidized tall oil.

Lower alkyl phospates are preferably selected from the group consisting of the $C_6$-$C_{12}$ mono-alkyl diphenyl esters of phosphoric acid, the phenyl $C_6$-$C_{12}$ di-alkyl esters of phosphoric acid and the $C_6$-$C_{12}$ tri-alkyl esters of phosphoric acid.

Alkyl sulfonates are preferably selected from the group consisting of the phenyl- and cresyl esters of $C_6$-$C_{18}$ alkyl sulfonic acid.

Diisononyl cyclohexanoate, diisooctyladipate, dioctyladipate, dioctyl terephthalate, dibutyl terephthalate, di-(2-ethylhexyl) phthalate, diisononyl phthalate, diisodecyl phthalate, di-n-octyl phthalate, isononylbenzoate, diethylene glycol dibenzoate, acetyl tributyl citrate and epoxidized soyabean oil are preferred plasticizers within the context of the present invention.

The inventors thus have found that high print quality and optimized processing conditions are obtained for one or more polymer layer(s) prepared from melt-mixing and calendering a composition comprising a blend of:

a) a first polymer with a Fikentscher K-value of 70 or less, b) a second polymer with a glass transition temperature of 80° C. or less, and c) a plasticizer content of 70 parts or less, per 100 parts of first polymer, said one or more polymer layer(s) further being characterized by a Young's modulus, measured according to ISO 527, comprised between 0.1 and 2.0 GPa, preferably between 0.2 and 1.7 GPa, more preferably between 0.3 and 1.4 GPa and most preferably between 0.4 and 1.1 GPa, In particular the high print quality is related to the Young's modulus of the one or more layer(s) comprising said print.

Besides the polymer blend, compositions according to the present invention may comprise further ingredients such as stabilizers, fillers and pigments or dyes.

Examples of fillers suitable for the composition of the present invention can be any conventional filler, especially those types traditionally used in surface coverings.

The filler can be organic, inorganic, or a combination of both. Examples include, but are not limited to coal fly ash, carbonate salts such as magnesium carbonate, calcium carbonate and calcium-magnesium carbonate, barium sulfate, carbon black, metal oxides, inorganic material, natural material, alumina trihydrate, magnesium hydroxide, bauxite, talc, mica, dolomite, barite, kaolin, silica, post-consumer glass, or post-industrial glass, synthetic and natural fiber, or any combination thereof.

Preferably the filler comprises talc, mica, calcium carbonate, magnesium carbonate, barite, kaolin, bauxite, dolomite, silica, glass, or any combination thereof.

Examples of pigments and dyes suitable for the composition of the present invention are metallic oxides such as titanium dioxide, iron oxide, zinc oxide and the like, metal hydroxides, metal powders, sulphides, sulphates, carbonates, silicates, iron blues, organic reds, organic maroons and the like.

Examples of stabilizers are benzotriazole and benzophenone compounds and hindered amine light stabilizers to reduce the degradation by sunlight and stabilizers to provide stability during heat processing which are typically metal compounds, particularly lead salts, organotin compounds, barium, cadmium and zinc salts, calcium/zinc stabilisers, phosphites and sterically hindered phenols.

The ink compositions for being used in the present invention are dryable and/or curable and are solvent containing, water based or solventless inks comprising one or more polymer(s) and/or oligomers selected from the group consisting of polyolefins, poly(meth)acrylics, polyesters, polyamides, polyvinyl chloride, latex, polycarbonates, polyurethanes, polyethers, alkyd resins and mixtures thereof and one or more dyes and/or pigments. By curable ink composition, the present invention means cross-linking under the influence of heat or under the influence of actinic radiation.

The print may be a decorative design. The decorative design may be natural designs and patterns such as a wood pattern or stone pattern. The decorative design may also be a fantasy design or pattern or a photograph.

The print may be obtained from a conventional printing process, such as for example offset printing, flexography, rotogravure or a digital printing process, such as single-pass and multi-pass.

In the case of a digital printing process, the printer is preferably an inkjet printer. Preferably, the printer is a DOD (Drop on Demand) piezo-electric inkjet printer. In particular the printer is a single pass DOD (Drop on Demand) piezo-electric inkjet printer. A thermal DOD inkjet printer may also be used.

For the particular case of single-pass digital printing of water based inks the prior application of a primer, such as for example disclosed in US 2014/0144583, is advisable. For the particular case of multi-pass digital printing, the use of radiation curable inks is advisable.

The printed decorative surface covering preferably comprises a protecting layer, arranged on and bonded to the printed surface preferably through calendering. Said protecting layer preferably comprises the polymer blend of the present invention.

A topcoat layer, comprising cross-linked material, preferably obtained from cross-linking radiation curable coating compositions, is arranged on a protecting layer in order to improve the wear resistance and chemical resistance of the protecting layer.

The topcoat layer is preferably obtained from curing a radiation curable coating composition, said radiation curable composition comprising ethylenically unsaturated polyacrylate, polyester or polyurethane polymers and/or oligomers and optionally ethylenically unsaturated monomers. The radiation curable composition preferably comprises a radiation curable aqueous polyurethane dispersion.

Wear resistant particles such as aluminium oxide particles may be included in the cross-linked topcoat layer. The cross-linked topcoat layer is preferably transparent.

The printed decorative surface coverings of the present invention may include a reinforced layer, comprising a carrier, such as a glass mat and/or non-woven.

The decorative floor and wall coverings of the present invention optionally are provided with a baking layer.

According to a first aspect of the present invention a printed decorative surface covering, more particularly floor and wall covering is provided.

According to a second aspect of the present invention a method for producing said decorative surface coverings is provided.

The method comprises:
providing one or more polymer layer(s), said one or more polymer layer(s) comprising a first polymer selected from the group consisting of polyvinyl chloride homo- and copolymers; and one or more second polymer(s) selected from the group consisting of the homo- or copolymers of one or more vinyl alkanoate(s), the copolymers comprising one or more alkenes and one or more vinyl alkanoate(s), the copolymers comprising one or more alkyl (meth)acrylates and mixtures of said homo- and/or copolymers;
applying an ink composition on at least one surface of the at least one polymer layer;
drying and/or curing the ink composition to form the printed layer.

In one embodiment the method comprises providing a polymer layer by melt-mixing and calendering the composition of the present invention and printing an ink composition on the top-surface of said polymer layer to form a printed layer.

In a second embodiment at least two polymer layers, obtained from melt-mixing and calendering the composition of the present invention are contacted through calendering to form a layer stack. An ink composition is printed on the top-surface of said layer stack to form a printed layer stack.

In a third embodiment at least two polymer layers, obtained from melt-mixing and calendering the composition of the present invention are provided. An ink composition is printed on at least one surface of at least one polymer layer. In this embodiment printing may be performed on the upper surface or the lower surface of the at least one polymer layer;

Of particular interest within this third embodiment is the application of two or more prints wherein printing is performed on:
one surface of more than one polymer layer, or
on both surfaces of the same polymer layer, or
on one surface of one polymer layer and on both surfaces of a second polymer layer.

Same pattern or design may be printed. Alternatively, the print or design may be different. Finally the two or more prints may together form a specific design.

The at least two polymer layers, of which at least one polymer layer comprises at least one print, subsequently are contacted through calendaring to form a printed layer stack.
Calendering is performed at:
a temperature comprised between 130 and 220° C., preferably between 150 and 210° C., more preferably between 170 and 200° C.;
a speed comprised between 2 and 25 m/min, preferably between 10 and 18 m/min, more preferably between 12 and 16 m/min.

Printing is performed after cooling down the one or more polymer layer(s) or the layer stack to a temperature comprised between 25 and 60° C., preferably between 30° C. and 50° C.

The step of drying- and/or curing the pigment ink composition comprises applying heat and/or actinic radiation to the ink composition.

Heat may be applied in form of for instance medium and/or short infrared irradiation and/or heated air.

Actinic radiation may be applied by exposure to actinic radiation such as ultraviolet (UV) radiation with a wavelength of for instance 250-600 nm obtained from for example medium and high-pressure mercury vapour lamps, lasers, pulsed lamps (flashlight), halogen lamps, excimer emitters, LED lamps.

On the other hand actinic irradiation comprises bombardment with high-energy electron beams (EB) at for instance 150-300 keV.

A protecting layer is preferably contacted and bonded to the printed surface of the printed layer or the printed layer stack through calendering to form the decorative substrate.

A cross-linkable topcoat preferably is applied on the top surface of the decorative substrate.

A radiation curable composition, preferably a radiation curable aqueous polyurethane dispersion is homogeneously applied on the top surface of the decorative substrate standing at a temperature comprised between 25 and 60° C., preferably between 30° C. and 50° C.

The radiation curable compositions of the present invention may be applied by any suitable coating process known to those of ordinary skill in the art, for example by direct gravure coating, reverse gravure coating, offset gravure coating, smooth roll coating, curtain coating, spray coating and combinations thereof. Direct gravure coating and smooth roll coating are preferred.

After evaporation of water, in a convection oven at about 100° C., the decorative substrate comprising the polyurethane top-layer optionally is heated to a temperature comprised between 100 and 200° C., and subsequently is mechanically embossed before cross-linking.

For the particular case where the radiation curable composition is not water based, such as for example a 100% solids or a near 100% solids composition said composition preferable is applied to the decorative substrate and cross-linked after the embossing step.

Mechanical embossing preferably is performed before irradiation of the uncured top-layer.

The embossed decorative substrate, comprising the uncured polyurethane coating, subsequently is cooled down to a temperature comprised between 30 and 70° C., preferably between 30 and 60° C. and subjected to actinic radiation to form the decorative substrate covering.

Mechanical embossing is performed by pressing a texture into the decorative surface covering comprising the polyurethane layer atop. Embossing is carried out at a pressure comprised between 10 and 25 kg·cm$^{-2}$ and surface temperature comprised between 100° C. and 200° C., preferably between 130° C. and 200° C.

The apparatus for mechanically embossing a substrate in general includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In general the texture obtained from mechanical embossing is characterized by a depth comprised between about 10 to 100 µm, a width comprised between about 125 to 400 µm, a wall angle (angle relative to surface) comprised between about 5 to 40 degrees and a frequency of about 4 to 20 features per cm.

It has been observed that the bonding strength between two or more polymer layer(s) comprising the polymer blend of the present invention is comparable to the bonding strength between two or more layers of the current polyvinyl chloride surface coverings.

Moreover the print does not reduce the bonding strength between the printed surface of one polymer layer and the printed or non-printed surface of an adjacent polymer layer.

Bonding between polymer layers, comprising the polymer blend of the present invention, is characterized peel strengths, according to ISO 24345:12 (Resilient floor coverings—determination of peel resistance) in excess of 50N/5 cm.

Furthermore, the print quality is not affected when contacting the printed surface with the printed or non-printed surface of an adjacent polymer layer.

EXAMPLES

The following illustrative examples are merely meant to exemplify the present invention and are not destined to limit or otherwise define the scope of the present invention.

Example 1: Preparation of the Polymer Layer

A polymer layer is prepared from the composition as given in the table 1.

TABLE 1

| Constituent | Formulation 1 | Formulation 2 |
| --- | --- | --- |
| Polymer a) | 100 | 100 |
| Polymer b) | 42.9 | 35.5 |
| Plasticizer | 28.6 | 24.3 |
| Stabilizer | 3.6 | 3.9 |
| Pigment | 7.1 | 29.8 |
| Filler | 28.6 | 133.2 |

In table 1,
for formulation 1, polymer a) is polyvinyl chloride having a Fikentscher K-value of 65; polymer b) is an ethylene/vinyl acetate copolymer having a vinyl acetate content of 90% by weight; plasticizer is diisononyl cyclohexanoate; stabilizer is a liquid Ca/Zn stabilizer (Lankromark® LZC 393 from Akcros); pigment is titanium dioxide and filler is calcium magnesium carbonate.
for formulation 2, polymer a) is Etinox® 610 from Ercros, a polyvinyl chloride having a Fikentscher K-value of 58; polymer b) is Levapren®900 from Lanxess, an ethylene/vinyl acetate copolymer having a vinyl acetate content of 90% by weight; plasticizer is a 78/22 mixture of Hexamoll® DINCH from BASF (diisononyl cyclohexanoate) and Vikoflex® 7170 from Arkema (epoxidized soyabean oil); stabilizer is a 80/20 mixture of Baerlocher® SM105 (ß-diketone) and Baerostab® CT341P (Ca/Zn stabilizer) from Baerlocher; pigment is Tioxide® R-FC5 from Huntsman and filler is Imercarb™ L from Imerys (CaCO$_3$).

A polymer layer of 120 µm thickness was prepared through melt-mixing in an extruder or internal and external mixer at a temperature of 170° C. and calendering in a roller mill at a temperature of 170° C.

Example 2: Preparation of a Layer Stack

Two separate polymer layers of example 1 were bonded in a hot/cold-pressing step at 160° C. at approximately 4 bar pressure, followed by cooling down to 25° C.

A peel strength, according to ISO 24345:12 above 50N/5 cm has been measured.

Example 3: Printed Polymer Layer

The polymer layer of example 1 was printed by means of a single pass digital printer with a water based ink. The print was dried during 3 seconds at 80° C. in an air ventilated oven. The printed image is fixated evenly over the surface of the polymer layer and a print result with good colour strength and resolution is achieved.

Example 4: Preparation of a Printed Layer Stack

The printed polymer layer of example 3 was bonded to a transparent polymer layer with its printed surface in contact with the transparent polymer, the transparent polymer layer having the same composition as in table 1 except for pigment and filler.

Bonding conditions were identical to those as in example 2. A peel strength, according to ISO 24345:12 above 50N/5 cm has been measured. The final print quality was identical to the one as observed in example 3.

The invention claimed is:
1. An article, wherein the article comprises:
a printed decorative flooring or wall covering comprising a polymer layer and comprising a decorative design print obtained by ink composition printing directly on at least one surface of said polymer layer, said polymer layer comprising a blend of, in relative proportions:
100 parts by weight of a first polymer selected from the group consisting of polyvinyl chloride, copolymers of vinylchloride and other ethylenically unsaturated monomers, and mixtures thereof;
from 5 to 100 parts by weight of a second polymer selected from the group consisting of:
i.) homo- or copolymer(s) comprising one or more vinyl alkanoate(s) defined by the general formula RCOOCH=CH$_2$, wherein R is an alkyl radical containing from 1 to 20 carbon atoms;
ii.) copolymers comprising one or more vinyl alkanoate(s), defined by the general formula RCOOCH=CH$_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
iii.) copolymers of alkyl (meth)acrylate(s) with 1 to 8 carbon atom(s) in the alkyl group; and
iv.) mixtures of i.) and ii.); i.) and iii.); ii.) and iii.); and i.), ii.) and iii.); and
from about 28 parts to about 135 parts by weight of filler.
2. The article according to claim 1, wherein the first polymer has a K-value comprised between 70 and 50, according to DIN 53726 (0.5 g/100 ml cyclohexanone @ 25° C.).
3. The article according to claim 1, wherein the second polymer has a glass transition temperature of 80° C. or less, measured by Differential Scanning calorimetry (DSC), according to ASTM D3418 with a heating gradient of 20° C. per minute.

4. The article according to claim 1, wherein the vinyl alkanoate homo- or copolymer i.) comprises 60% by weight or more of vinyl acetate.

5. The article according to claim 1, wherein the alkene/vinyl alkanoate copolymer ii.) comprises 60% by weight or more of vinyl alkanoate.

6. The article according to claim 1, wherein the alkyl (meth)acrylate copolymer iii.) is a block copolymer comprising one or more blocks of methacrylic ester units and one or more blocks of acrylic ester units.

7. The article according to claim 1, wherein the alkyl (meth)acrylate copolymer iii.) is a tri-block copolymer comprising a n-butylacrylate block and two methyl methacrylate blocks.

8. The article according to claim 1, wherein the polymer layer comprises, per 100 parts of the first polymer, from 5 to 70 parts by weight of one or more plasticizer(s) selected from the group consisting of: dialkyl esters of cyclohexane dicarboxylic acids; dialkyl esters of aliphatic dicarboxylic acids; alkyl esters of aromatic mono- di-, tri-, or tetra-carboxylic acids; lower alkyl citrates; epoxidized or otherwise derivatized vegetable oils; lower alkyl phosphates, alkyl sulfonates and mixtures thereof.

9. The article according to claim 1, wherein the decorative design print comprises one or more polymer(s) and/or oligomers selected from the group consisting of: polyolefins, poly(meth)acrylics, polyesters, polyamides, polyvinyl chloride, latex, polycarbonates, polyurethanes, polyethers, alkyd resins, mixtures thereof, said decorative print further comprising one or more dyes and/or pigments.

10. A method for the preparation of an article, wherein the article comprises:
a printed decorative flooring or wall covering, the flooring or wall covering comprising one or more polymer layers and comprising a decorative design print obtained by ink composition printing directly on at least one surface of said one or more polymer layers, said one or more polymer layers comprising a blend of, in relative proportions:
100 parts by weight of a first polymer selected from the group consisting of polyvinyl chloride, copolymers of vinylchloride and other ethylenically unsaturated monomers, and mixtures thereof;
from 5 to 100 parts by weight of a second polymer selected from the group consisting of:
  i.) homo- or copolymer(s) comprising one or more vinyl alkanoate(s) defined by the general formula $RCOOCH=CH_2$, wherein R is an alkyl radical containing from 1 to 20 carbon atoms;
  ii.) copolymers comprising one or more vinyl alkanoate(s), defined by the general formula $RCOOCH=CH_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
  iii.) copolymers of alkyl (meth)acrylate(s) with 1 to 8 carbon atom(s) in the alkyl group; and
  iv.) mixtures of i.) and ii.); i.) and iii.); ii.) and iii.); and i.), ii.) and iii.); and
from about 28 parts to about 135 parts by weight of filler, said method comprising the steps:

step 1: providing one or more polymer layer(s), said one or more polymer layer(s) comprising the first polymer and the second polymer;
step 2: applying a decorative design print on at least one surface of the at least one polymer layer, with an ink composition;
step 3: drying and/or curing the ink composition to form the decorative flooring or wall covering.

11. The method according to claim 10, wherein the ink composition is a radiation curable ink composition.

12. The method according to claim 10, wherein the one or more polymer layers of step 1 are at least two polymer layers and are contacted through calendering forming a layer stack which further is converted in steps 2 and 3 into a printed layer stack.

13. The method according to claim 10, wherein the one or more polymer layers of step 3 are at least two polymer layers, and having a print on at least one surface of at least one of said layers, are contacted through calendering forming a printed layer stack.

14. The method according to claim 10, comprising the additional step of contacting the top-surface of the printed layer stack with a protecting layer said protecting layer comprising the first polymer.

15. The method according to claim 10, wherein the protecting layer is contacted to the printed layer stack through calendering.

16. The method according to claim 15, comprising the additional step of contacting the top surface of the protecting layer with a topcoat layer comprising a cross-linked material.

17. An article, wherein the article comprises:
a printed decorative flooring or wall covering comprising a polymer layer and comprising a decorative design print obtained by ink composition printing directly on at least one surface of said polymer layer, said polymer layer comprising a blend of, in relative proportions:
100 parts by weight of a first polymer selected from the group consisting of polyvinyl chloride, copolymers of vinylchloride and other ethylenically unsaturated monomers, and mixtures thereof;
from 5 to 100 parts by weight of a second polymer selected from the group consisting of:
  i.) homo- or copolymer(s) comprising one or more vinyl alkanoate(s) defined by the general formula $RCOOCH=CH_2$, wherein R is an alkyl radical containing from 1 to 20 carbon atoms;
  ii.) copolymers comprising one or more vinyl alkanoate(s), defined by the general formula $RCOOCH=CH_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
  iii.) copolymers of alkyl (meth)acrylate(s) with 1 to 8 carbon atom(s) in the alkyl group; and
  iv.) mixtures of i.) and ii.); i.) and iii.); ii.) and iii.); and i.), ii.) and iii.);
the printed decorative flooring or wall covering further comprising a cross-linked topcoat.

18. An article, wherein the article comprises:
a printed decorative flooring or wall covering comprising a plurality of polymer layers and comprising a decorative design print obtained by ink composition printing directly on at least one surface of said plurality of polymer layers, each one said plurality of polymer layers comprising a blend of, in relative proportions:

100 parts by weight of a first polymer selected from the group consisting of polyvinyl chloride, copolymers of vinylchloride and other ethylenically unsaturated monomers, and mixtures thereof;

from 5 to 100 parts by weight of a second polymer selected from the group consisting of:
- i.) homo- or copolymer(s) comprising one or more vinyl alkanoate(s) defined by the general formula $RCOOCH=CH_2$, wherein R is an alkyl radical containing from 1 to 20 carbon atoms;
- ii.) copolymers comprising one or more vinyl alkanoate(s), defined by the general formula $RCOOCH=CH_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
- iii.) copolymers of alkyl (meth)acrylate(s) with 1 to 8 carbon atom(s) in the alkyl group; and
- iv.) mixtures of i.) and ii.); i.) and iii.); ii.) and iii.); and i.), ii.) and iii.); and from about 28 parts to about 135 parts by weight of filler.

19. An article, wherein the article comprises:

a printed decorative flooring or wall covering comprising a plurality of polymer layers and comprising a decorative design print obtained by ink composition printing directly on at least one surface of said plurality of polymer layers, each one of said plurality of polymer layers comprising a blend of, in relative proportions:

100 parts by weight of a first polymer selected from the group consisting of polyvinyl chloride, copolymers of vinylchloride and other ethylenically unsaturated monomers, and mixtures thereof;

from 5 to 100 parts by weight of a second polymer selected from the group consisting of:
- i.) homo- or copolymer(s) comprising one or more vinyl alkanoate(s) defined by the general formula $RCOOCH=CH_2$, wherein R is an alkyl radical containing from 1 to 20 carbon atoms;
- ii.) copolymers comprising one or more vinyl alkanoate(s), defined by the general formula $RCOOCH=CH_2$, wherein R is an alkyl radical containing from 1 to 20 carbon atoms, and one or more alkene(s), defined by the general formula $R_1R_2C=CR_3R_4$, wherein $R_1$, $R_2$, $R_3$ and $R_4$ independently is a hydrogen or an alkyl radical containing from 1 to 4 carbon atoms;
- iii.) copolymers of alkyl (meth)acrylate(s) with 1 to 8 carbon atom(s) in the alkyl group; and
- iv.) mixtures of i.) and ii.); i.) and iii.); ii.) and iii.); and i.), ii.) and iii.); and the printed decorative flooring or wall covering further comprising a cross-linked topcoat.

* * * * *